(12) United States Patent
Uchida

(10) Patent No.: US 7,991,005 B2
(45) Date of Patent: Aug. 2, 2011

(54) COMMUNICATION APPARATUS, COMMUNICATION METHOD, PROGRAM, AND COMMUNICATION SYSTEM

(75) Inventor: Shigenori Uchida, Kanagawa (JP)

(73) Assignee: Sony Corporation, Tokyo (JP)

( * ) Notice: Subject to any disclaimer, the term of this patent is extended or adjusted under 35 U.S.C. 154(b) by 121 days.

(21) Appl. No.: 12/464,528

(22) Filed: May 12, 2009

(65) Prior Publication Data

US 2009/0285114 A1 Nov. 19, 2009

(30) Foreign Application Priority Data

May 14, 2008 (JP) ................ P2008-127333

(51) Int. Cl.
*H04J 3/24* (2006.01)
(52) U.S. Cl. ........................................... 370/473
(58) Field of Classification Search .......... 370/328–339, 370/394, 468–474
See application file for complete search history.

(56) References Cited

U.S. PATENT DOCUMENTS

| | | | | |
|---|---|---|---|---|
| 7,706,397 | B2 * | 4/2010 | Trainin et al. ................ | 370/445 |
| 2004/0151126 | A1 * | 8/2004 | Matsubara .................... | 370/252 |
| 2006/0221879 | A1 * | 10/2006 | Nakajima et al. ............. | 370/310 |
| 2010/0189056 | A1 * | 7/2010 | Nishibayashi et al. ........ | 370/329 |

FOREIGN PATENT DOCUMENTS

| | | |
|---|---|---|
| JP | 10-308791 | 11/1998 |
| JP | 2003-174470 | 6/2003 |
| WO | WO 2006/080403 | 8/2006 |

OTHER PUBLICATIONS

IEEE P802.11n™/D3.07, Draft Standard for Information Technology—Telecommunications and information exchange between systems—Local and metropolitan area networks—Specific requirements—Part 11: Wireless LAN Medium Access Control (MAC) and Physical Layer (PHY) specifications: Amendments 4: Enhancements for Higher Throughput (2008).

* cited by examiner

*Primary Examiner* — Frank Duong
(74) *Attorney, Agent, or Firm* — Finnegan, Henderson, Farabow, Garrett & Dunner, LLP

(57) ABSTRACT

A communication apparatus includes a receiving unit that receives a data frame including a plurality of pieces of unit data and transmitted from a communication partner; a determining unit that determines whether there is data loss, for each piece of unit data included in the data frame received by the receiving unit; a transmission right acquiring unit that acquires a transmission right; and a generating unit that generates grant data for granting the transmission right acquired by the transmission right acquiring unit to the communication partner, when the determining unit determines that at least any one of the pieces of unit data has been lost.

8 Claims, 8 Drawing Sheets

FIG.1
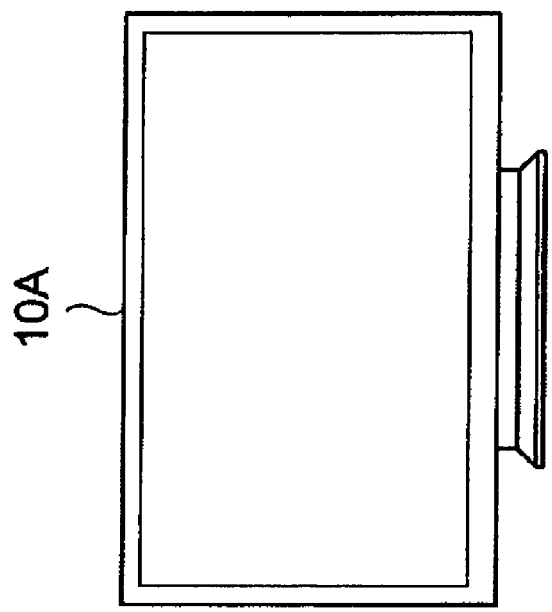
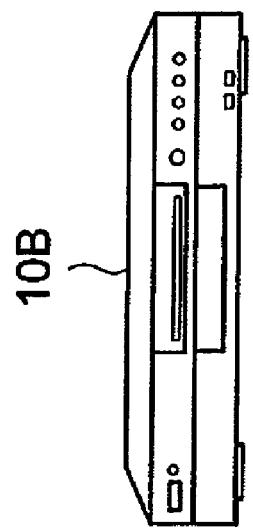

FIG.4

| Link Adaptation Control | Calibration Position | Calibration Sequence | Reserved | CSI/ Steering | NDP Announce- ment | Reserved | AC Constraint | RDG/ More PPDU |

COMMUNICATION APPARATUS, COMMUNICATION METHOD, PROGRAM, AND COMMUNICATION SYSTEM

BACKGROUND OF THE INVENTION

1. Field of the Invention

The present invention relates to a communication apparatus, a communication method, a program, and a communication system.

2. Description of the Related Art

Recently, IEEE (Institute of Electrical and Electronic Engineers) 802.11n for achieving high-speed wireless communication has been studied. In the IEEE802.11n, in order to achieve transmission efficiency of MAC (Media Access Control), retransmission control schemes such as packet aggregation and selective ACK are expected to be used in combination.

In IEEE802.11n ("IEEE802.11n" The 802.11n Working Group of the 802 Committee), for a protocol used by communication apparatuses to perform bidirectional communication, a reverse direction sequence (hereinafter, referred to as an "RD scheme") is proposed.

More specifically, the RD scheme is a scheme in which an initiator that has acquired a transmission right (access right) for a communication path, by a CSMA/CA (Carrier Sense Multiple Access with Collision Avoidance) procedure, etc., performs granting of the transmission right (RD Grant; hereinafter, referred to as "RDG") to a responder. The RD scheme enables transmission by the responder within a transmission opportunity (TXOP) acquired by the initiator and thus is effective in that the collision probability for bidirectional communication can be reduced.

Note that an IEEE802.11 MAC layer requires packets provided from an upper layer of a transmitter side to be delivered to an upper layer of a receiver side in the order that the packets are provided. Therefore, the receiver side arranges packets that have arrived in an overlapping manner or in a reverse order through varying wireless communication paths, according to sequence numbers provided to the packets by the transmitter side and then supplies the packets to the upper layer of the receiver side.

SUMMARY OF THE INVENTION

However, in the RD scheme, how RDG is performed to a responder has flexibility and in what case RDG is performed to the responder has not been specifically studied.

The present invention is made in view of the foregoing and other problems. There is a need for a novel and improved communication apparatus, communication method, program, and communication system that are capable of improving throughput by performing granting of a transmission right when a predetermined condition is satisfied.

According to an embodiment of the present invention, there is provided a communication apparatus including: a receiving unit that receives a data frame including a plurality of pieces of unit data and transmitted from a communication partner; a determining unit that determines whether there is data loss, for each piece of unit data included in the data frame received by the receiving unit; a transmission right acquiring unit that acquires a transmission right; and a generating unit that generates grant data for granting the transmission right acquired by the transmission right acquiring unit to the communication partner, when the determining unit determines that at least any one of the pieces of unit data has been lost.

The communication apparatus may further include a storage unit that stores determination results obtained by the determining unit, and the generating unit may generate the grant data based on the determination results stored in the storage unit, when the transmission right acquiring unit acquires a transmission right.

Each of the pieces of unit data may include a piece of consecutive identification information, the storage unit may store identification information of a piece of unit data that is determined by the determining unit to have not been lost, and the generating unit may generate the grant data when pieces of identification information stored in the storage unit are inconsecutive.

The communication apparatus may further include a transmitting unit that transmits determination results obtained by the determining unit to the communication partner.

The receiving unit may receive from the communication partner management information for forming a wireless network by a plurality of communication apparatuses, and the generating unit may generate the grant data when the management information indicates that the communication partner has data destined for the communication apparatus.

According to another embodiment of the present invention, there is provided a communication method including the steps of: receiving a data frame including a plurality of pieces of unit data and transmitted from a communication partner; determining whether there is data loss, for each piece of unit data included in the data frame; acquiring a transmission right; and generating grant data for granting the transmission right to the communication partner, when it is determined that any one of the pieces of unit data has been lost.

According to another embodiment of the present invention, there is provided a program causing a computer to function as: a receiving unit that receives a data frame including a plurality of pieces of unit data and transmitted from a communication partner; a determining unit that determines whether there is data loss, for each piece of unit data included in the data frame received by the receiving unit; a transmission right acquiring unit that acquires a transmission right; and a generating unit that generates grant data for granting the transmission right acquired by the transmission right acquiring unit to the communication partner, when the determining unit determines that at least any one of the pieces of unit data has been lost.

According to another embodiment of the present invention, there is provided a communication system including: a first communication apparatus that transmits a data frame including a plurality of pieces of unit data; and a second communication apparatus including: a receiving unit that receives the data frame; a determining unit that determines whether there is data loss, for each piece of unit data included in the data frame received by the receiving unit; a transmission right acquiring unit that acquires a transmission right; and a generating unit that generates grant data for granting the transmission right acquired by the transmission right acquiring unit to the first communication apparatus, when the determining unit determines that at least any one of the pieces of unit data has been lost.

According to the embodiments of the present invention described above, by performing granting of a transmission right when a predetermined condition is satisfied, an improvement in throughput can be achieved.

BRIEF DESCRIPTION OF THE DRAWINGS

FIG. 1 is an illustrative diagram showing an exemplary configuration of a wireless communication system according to an embodiment of the present invention;

FIG. 4 is an illustrative diagram showing an exemplary configuration of an HT control field in the MAC header;

DETAILED DESCRIPTION OF THE PREFERRED EMBODIMENTS

Figure 2:
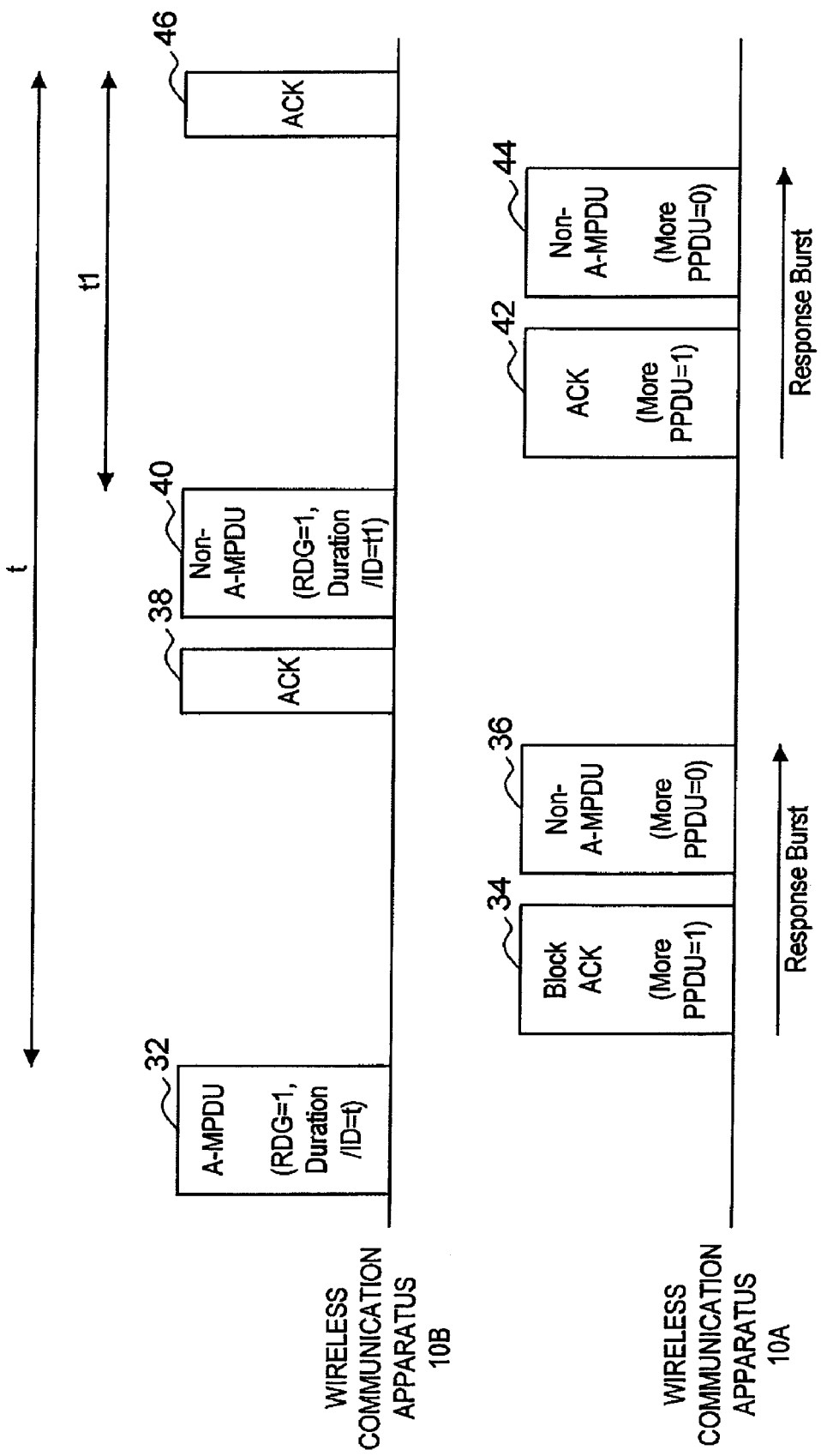
FIG. 2 is an illustrative diagram showing an example of the flow of communication by an RD scheme.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The "Detailed Description of the Preferred Embodiments" will be described in order of the following categories.
[1] Summary of an Embodiment of the Present Invention
 (Configuration of a Wireless Communication System)
 (RD Scheme)
[2] Configurations of Wireless Communication Apparatuses According to the Embodiment
 (Responder Side)
 (Initiator Side)
[3] Operations of the Wireless Communication Apparatuses According to the Embodiment
[4] Conclusion
[1] SUMMARY of an Embodiment of the Present Invention
(Configuration of a Wireless Communication System)

First, a wireless communication system 1 (communication system, BBS) according to an embodiment of the present invention will be schematically described with reference to FIG. 1.

FIG. 1 is an illustrative diagram showing an exemplary configuration of the wireless communication system 1 according to an embodiment of the present invention. As shown in FIG. 1, the wireless communication system 1 includes a plurality of wireless communication apparatuses 10A and 10B (hereinafter, simply collectively referred to as the "wireless communication apparatuses 10" when it is not particularly necessary to distinguish between the wireless communication apparatuses 10A and 10B). Here, an example will be described in which the wireless communication apparatuses 10 wirelessly communicate with each other by a wireless LAN (Local Area Network) scheme defined by IEEE802.11n, for example.

FIG. 1 shows an example in which the wireless communication apparatus 10B is an HD (High Definition) storage apparatus such as a hard disk recorder and the wireless communication apparatus 10A is a display apparatus. In this case, such a use mode is assumed that the wireless communication apparatus 10B wirelessly transmits an HD stream to the wireless communication apparatus 10A, the wireless communication apparatus 10A displays an image based on the HD stream, and a user views the image displayed on the wireless communication apparatus 10A.

More specifically, a wireless communication apparatus 10 acquires a transmission right valid for a certain period of time by, for example, a CSMA/CA scheme that avoids packet collisions based on carrier sense, and is thereby allowed to perform transmission within the certain period of time. Note, however, that in the CSMA/CA scheme, packet collisions may occur if simultaneous transmission is performed when bidirectional traffic occurs.

In the wireless communication system 1 shown in FIG. 1, too, not only communication of an HD stream from the wireless communication apparatus 10B to the wireless communication apparatus 10A but also communication from the wireless communication apparatus 10A to the wireless communication apparatus 10B based on the TCP protocol occurs to some extent. Hence, with the use of only the CSMA/CA scheme in the wireless communication system 1 shown in FIG. 1, throughput decreases due to degradation of transmission efficiency caused by packet collisions such as those described above or an increase of contention window.

For this reason, in the wireless communication system 1 shown in FIG. 1, an RD scheme proposed in IEEE802.11n is applied. The RD scheme will be described below with reference to FIGS. 2 to 4. Note that in FIG. 1 the wireless communication apparatuses 10A and 10B are shown merely as examples of a communication apparatus and thus the communication apparatuses are not limited to the examples. For example, the communication apparatuses may be information processing apparatuses such as PCs (Personal Computers), household video processing apparatuses (DVD recorders, VCRs, etc.), mobile phones, PHSs (Personal Handyphone Systems), portable music players, portable video processing apparatuses, PDAs (Personal Digital Assistants), home-use game machines, portable game machines, or household electrical appliances. Note also that although in FIG. 1 an example is described in which the wireless communication apparatuses 10A and 10B shown as examples of a communication apparatus perform wireless communication, the present invention is not limited to the example. The present invention can also be applied to the case in which, for example, a plurality of communication apparatuses perform communication by wire.
(RD Scheme)

FIG. 2 is an illustrative diagram showing an example of the flow of communication by the RD scheme. First, the wireless communication apparatus 10B having acquired a transmission right by EDCA (Enhanced Distributed Channel Access), etc., transmits an aggregated packet 32 (A-MPDU). It is assumed that in the aggregated packet 32 are provided information indicating that a transmission right is granted to the wireless communication apparatus 10A and information on remaining time for the transmission right. Specifically, information indicating that a transmission right is granted to the wireless communication apparatus 10A is provided in an RDG/More PPDU field included in an HT control field in a MAC header, as shown in FIGS. 3 and 4.

Figure 3:
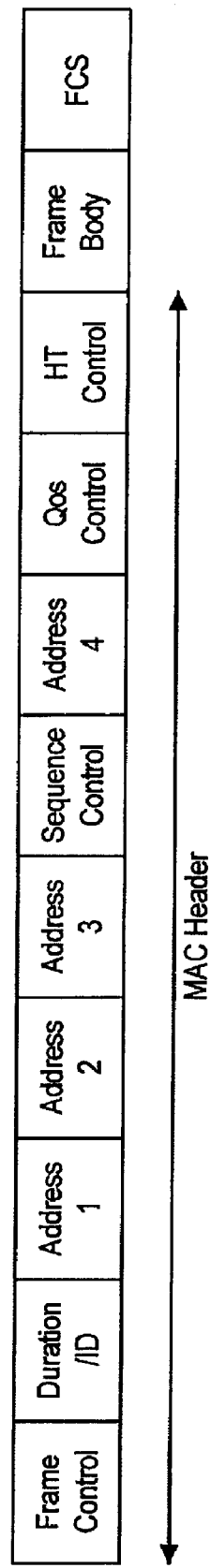
FIG. 3 is an illustrative diagram showing an exemplary configuration of a MAC header.

FIG. 3 is an illustrative diagram showing an exemplary configuration of a MAC header. FIG. 4 is an illustrative diagram showing an exemplary configuration of an HT control field in the MAC header. As shown in FIG. 3, the MAC header includes a frame control field, a duration/ID field, address 1 to 3 fields, a sequence control field, an address 4 field, a Qos control field, and an HT control field, and a frame body and an FCS are added thereto. Note that remaining time t for a transmission right is provided in the duration/ID field.

As shown in FIG. 4, the HT control field includes a link adaptation control field, a calibration position field, a calibration sequence field, a reserved field, a CSI/Steering field, an NDP announcement field, a reserved field, an AC constraint field, and an RDG/More PPDU field. In FIG. 2, providing "1" in the RDG/More PPDU field indicates that a transmission right is granted to the wireless communication apparatus 10A.

Returning to the description of the RD scheme with reference to FIG. 2, the wireless communication apparatus 10A having received the aggregated packet 32 in which "1" is provided in the RDG/More PPDU field transmits a block ACK 34 responding to the aggregated packet 32. Since the wireless communication apparatus 10A has an intention of transmission, "1" is provided in an RDG/More PPDU field of the block ACK 34. Furthermore, since the wireless communication apparatus 10A is granted a transmission right by the wireless communication apparatus 10B, the wireless communication apparatus 10A transmits an unaggregated packet 36 within a response burst.

When the wireless communication apparatus 10B receives the packet 36 from the wireless communication apparatus 10A, the wireless communication apparatus 10B transmits an ACK 38 responding to the packet 36. Thereafter, if necessary, packets 40, 42, 44, and 46 are transmitted and received in the same manner.

Note that although FIG. 2 shows an example in which a packet to be transmitted when the wireless communication apparatus 10B grants a transmission right is an aggregated packet, the packet does not need to be aggregated. Similarly, although FIG. 2 shows an example in which the wireless communication apparatus 10A transmits an unaggregated packet, the wireless communication apparatus 10A may transmit an aggregated packet. Whether the wireless communication apparatuses 10 transmit an aggregated packet depends on an aggregation policy including, for example, the amount of packets accumulated in the wireless communication apparatuses 10 and a state of a block ACK protocol.

In this specification, an apparatus that grants an acquired transmission right to a communication partner may be referred to as an "initiator" and an apparatus that is granted the transmission right may be referred to as a "responder". That is, in the above-described example, the wireless communication apparatus 10B corresponds to an "initiator" and the wireless communication apparatus 10A corresponds to a "responder". However, the wireless communication apparatuses 10A and 10B can also function as an "initiator" and a "responder", respectively. In the following, description is made placing emphasis on an example in which the wireless communication apparatus 10B functions as a "responder" and the wireless communication apparatus 10A functions as an "initiator".

As described above, according to the RD scheme, by an initiator appropriately granting a transmission right to a responder, the frequency of a transmission right obtaining process using a CSMA/CA procedure by the responder is reduced. As a result, packet collisions and an increase of contention window associated with packet collisions are suppressed, enabling to achieve an increase in throughput.

However, no specific studies have been conducted on by what the initiator is triggered to grant a transmission right. In view of such circumstances, the wireless communication apparatuses 10 according to the present embodiment are created. According to the wireless communication apparatuses 10 according to the present embodiment, a transmission right is granted when a predetermined condition is satisfied, whereby an improvement in throughput can be achieved. Such wireless communication apparatuses 10 will be described below with reference to FIGS. 5 to 8.

[2] Configurations of Wireless Communication Apparatuses According to the Embodiment (Responder Side)

First, a configuration of the wireless communication apparatus 10B having a function as a responder will be described with reference to FIG. 5.

Figure 5:
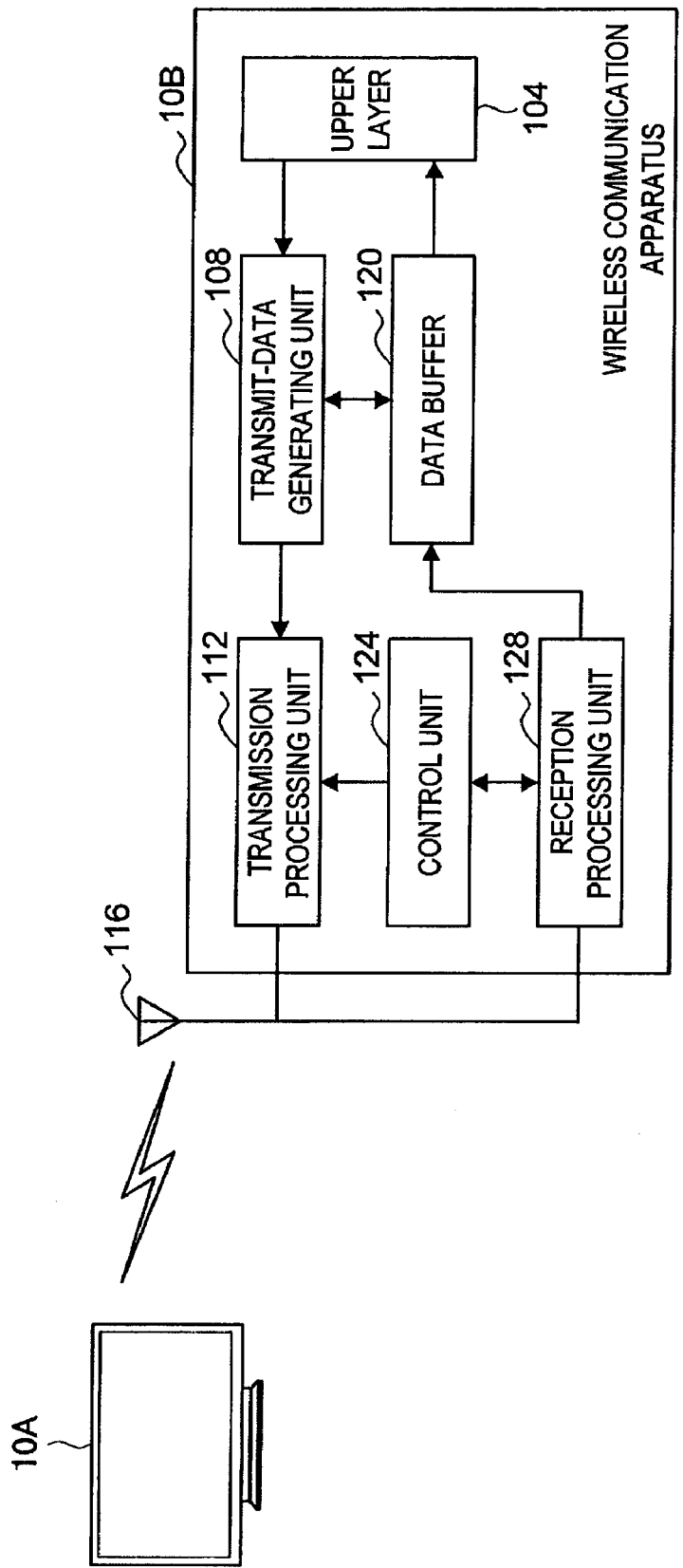
FIG. 5 is a functional block diagram showing a configuration of a wireless communication apparatus having a function as a responder.

FIG. 5 is a functional block diagram showing a configuration of the wireless communication apparatus 10B having a function as a responder. As shown in FIG. 5, the wireless communication apparatus 10B has an upper layer 104, a transmit-data generating unit 108, a transmission processing unit 112, an antenna 116, a data buffer 120, a control unit 124, and a reception processing unit 128.

The transmit-data generating unit 108 has a function as a generating unit that generates a packet or aggregated packet (data frame), based on data to be input from the upper layer 104. Here, the transmit-data generating unit 108 assigns and provides a consecutive sequence number (identification information) serving as a unique index, to the packet or each of a plurality of packets (unit data) configuring the aggregated packet.

Note that examples of the data to be input from the upper layer 104 include music data such as music, a lecture, and a radio program, video data such as a movie, a television program, a video program, a photo, a document, a painting, and a diagram, and arbitrary data such as a game and software.

The packet or aggregated packet generated by the transmit-data generating unit 108 is supplied to the transmission processing unit 112 and is also temporarily held in the data buffer 120. Note that the transmit-data generating unit 108 can generate arbitrary transmit data such as block ACKs and ACKs, in addition to aggregated packets.

The transmission processing unit 112 performs, based on control by the control unit 124, signal processing on the packet or aggregated packet supplied from the transmit-data generating unit 108, to convert the packet into a radio-frequency signal. Note that the content of signal processing performed by the transmission processing unit 112 varies depending on the communication function implemented on the wireless communication apparatus 10B.

For example, the wireless communication apparatus 10B may have a wireless communication function defined by IEEE802.11a, b, g, etc., or may have a MIMO (Multiple Input Multiple Output) communication function defined by IEEE802.11n. Alternatively, the wireless communication apparatus 10B may have a communication function that supports WiMAX (Worldwide Interoperability for Microwave Access) specified by IEEE802.16. Furthermore, the wireless communication apparatus 10B may have a communication function that supports a wired LAN defined by IEEE802.3.

The antenna 116 has a function as a transmitting unit that transmits the packet or aggregated packet having been converted into a radio-frequency signal by the transmission processing unit 112. The antenna 116 also has a function as a receiving unit that receives a packet transmitted from a communication apparatus therearound such as the wireless communication apparatus 10A.

The reception processing unit 128 decodes, by signal processing, a packet received by the antenna 116. The content of signal processing performed by the reception processing unit 128 also varies depending on the communication function implemented on the wireless communication apparatus 10B, as with the transmission processing unit 112.

The data buffer 120 has a function as a storage unit that temporarily holds the packet or aggregated packet generated by the transmit-data generating unit 108 and a packet received from the reception processing unit 128. The aggregated packet generated by the transmit-data generating unit 108 is held in the data buffer 120 so that the aggregated packet can be retransmitted when the aggregated packet has not normally arrived on the wireless communication apparatus 10A (when data loss has occurred).

Thus, when an ACK from the wireless communication apparatus 10A indicating that an aggregated packet has been normally received is decoded by the reception processing unit 128, the aggregated packet is deleted from the data buffer 120. Also, when an ACK indicating that at least part of an aggregated packet has been normally received is decoded by the reception processing unit 128, similarly, the part of an aggregated packet is deleted from the data buffer 120. For example, when an ACK indicating that a packet with a sequence number "7" has been normally received is decoded by the reception processing unit 128, a packet with a sequence number "7" is deleted from the data buffer 120.

Note that such a data buffer 120 may be a nonvolatile memory such as an EEPROM (Electrically Erasable Programmable Read-Only Memory) or EPROM (Erasable Programmable Read Only Memory), a magnetic disk such as a hard disk or circular magnetic disk, an optical disc such as a CD-R (Compact Disc Recordable)/RW (ReWritable), DVD-R (Digital Versatile Disc Recordable)/RW/+R/+RW/RAM (Random Access Memory), or BD (Blu-Ray Disc (registered trademark))-R/BD-RE, or a storage medium such as an MO (Magneto Optical) disk.

The control unit 124 controls the transmission processing unit 112 such that a packet or aggregated packet is transmitted from the wireless communication apparatus 10B, when a transmission right is acquired by, for example, the wireless communication apparatus 10A granting the transmission right thereto. Specifically, the control unit 124 can determine whether there is a transmission right, based on information provided in an RDG/More PPDU field included in an HT control field in a MAC header decoded by the reception processing unit 128.

Note that although the above description is made of a configuration in which the wireless communication apparatus 10B functions as a responder, the wireless communication apparatus 10B may be configured to function as an initiator such as the wireless communication apparatus 10A which will be described below.

(Initiator Side)

Next, the wireless communication apparatus 10A having a function as an initiator will be described with reference to FIG. 6.

Figure 6:
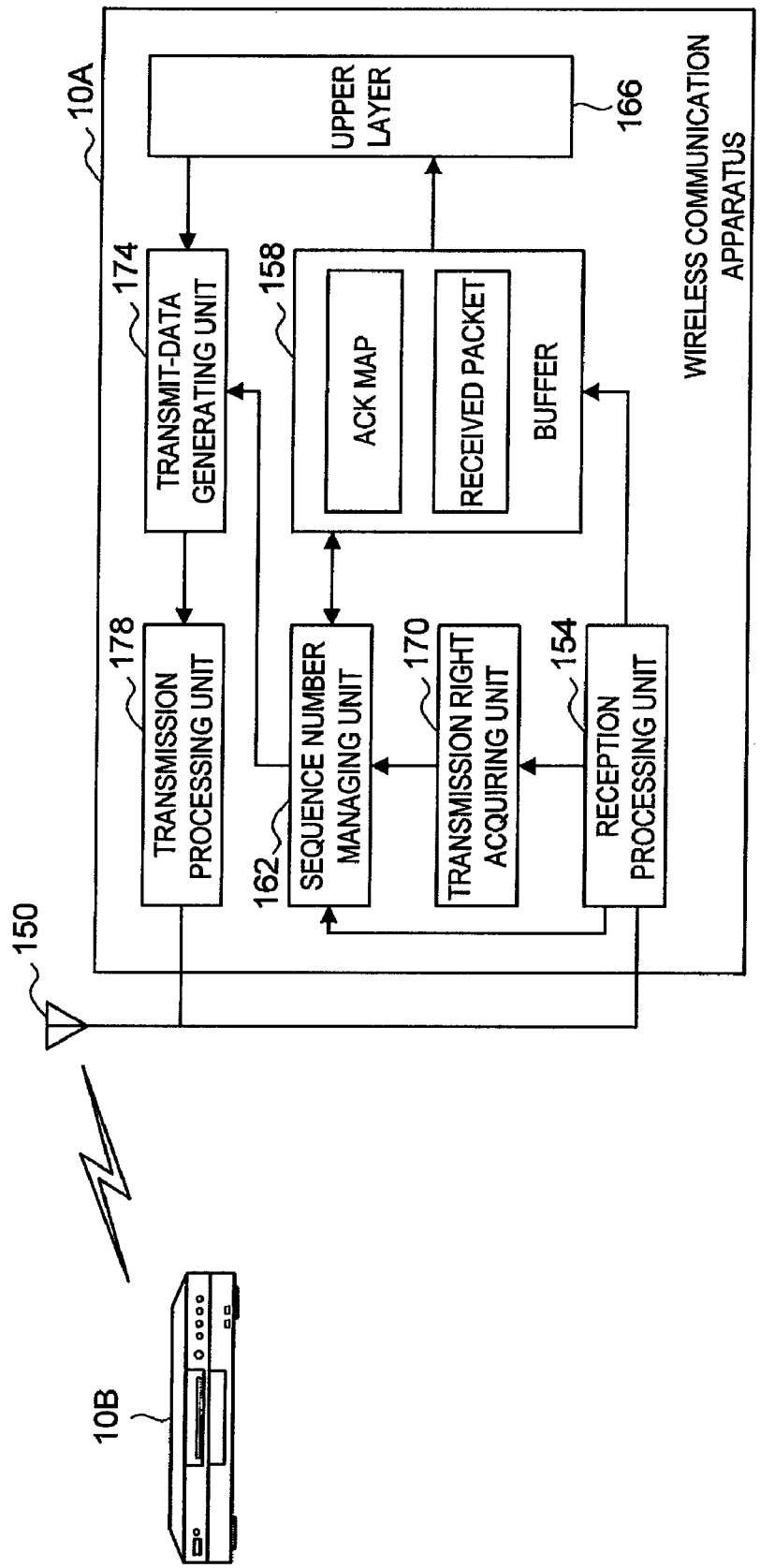
FIG. 6 is a functional block diagram showing a configuration of a wireless communication apparatus having a function as an initiator.

FIG. 6 is a functional block diagram showing a configuration of the wireless communication apparatus 10A having a function as an initiator. As shown in FIG. 6, the wireless communication apparatus 10A has an antenna 150, a reception processing unit 154, a buffer 158, a sequence number managing unit 162, an upper layer 166, a transmission right acquiring unit 170, a transmit-data generating unit 174, and a transmission processing unit 178.

The antenna 150 is an interface with a communication apparatus therearound such as the wireless communication apparatus 10B. Specifically, the antenna 150 has a function as a transmitting unit that transmits a block ACK, an aggregated packet, etc., supplied from the transmission processing unit 178 and a function as a receiving unit that receives a block ACK, an aggregated packet, etc., from a communication apparatus therearound.

The reception processing unit 154 decodes, by signal processing, the block ACK or aggregated packet received by the antenna 150. Also, when an aggregated packet is received by the antenna 150, the reception processing unit 154 determines whether there is data loss, for each of packets configuring the aggregated packet. For example, a parity bit is added to each of packets configuring an aggregated packet and thus the reception processing unit 154 can determine whether there is data loss, based on the parity bit. Note that the content of signal processing performed by the reception processing unit 154 varies depending on the communication function implemented on the wireless communication apparatus 10A, as with the wireless communication apparatus 10B.

The buffer 158 temporarily holds the packet or aggregated packet decoded by the reception processing unit 154 or part of the aggregated packet. The buffer 158 further records an ACK map, based on management by the sequence number managing unit 162. The buffer 158 may be, as with the data buffer 120 of the wireless communication apparatus 10B, a nonvolatile memory such as an EEPROM or EPROM, a magnetic disk such as a hard disk or circular magnetic disk, an optical disc such as a CD-R/RW, DVD-R/RW/+R/+RW/RAM, or BD (Blu-Ray Disc (registered trademark))-R/BD-RE, or a storage medium such as an MO disk.

The sequence number managing unit 162 provides a sequence number of a packet that has been normally decoded by the reception processing unit 154, in the ACK map. Thus, when all packets configuring an aggregated packet have been normally decoded, consecutive sequence numbers corresponding to the number of packets configuring the aggregated packet are provided in the ACK map. Then, when sequence numbers provided in the ACK map are consecutive (when there is no missing sequence number or when there is no lack of sequence numbers), packets having those sequence numbers are output from the buffer 158 to the upper layer 166.

On the other hand, when sequence numbers provided in the ACK map are inconsecutive, packets having those sequence numbers continue to be held in the buffer 158 until a packet having a missing sequence number is received, whereby the sequence numbers in the ACK map become consecutive. By such a configuration, consecutive outputs (in-sequence delivery) of packets to the upper layer 166 are achieved.

Note, however, that causing the buffer 158 to unlimitedly hold packets until reception of a packet having a missing sequence number causes an increase in latency between transmitting and receiving apparatuses. Hence, it is effective to set a window value W for a certain section from the first sequence number N held in the buffer 158. Specifically, when a packet having a sequence number greater than or equal to N+W is decoded by the reception processing unit 154, packets present before a packet with a missing sequence number may be deleted from the buffer 158 and the packets having consecutive sequence numbers may be output.

The transmission right acquiring unit 170 acquires a transmission right valid for a certain period of time, by an arbitrary method such as a CSMA/CA procedure. When the transmission right acquiring unit 170 has acquired a transmission right, the sequence number managing unit 162 determines, for packets held in the buffer 158, whether there is a missing sequence number, by referring to the ACK map. Namely, the sequence number managing unit 162 has a function as a determining unit that determines whether there is data loss, for each of packets configuring an aggregated packet transmitted from the wireless communication apparatus 10B. Note that the CSMA/CA procedure is merely mentioned above as an example of a transmission right acquisition method and thus the transmission right acquisition method is not limited to the example. For example, the transmission right acquiring unit 170 may acquire a transmission right by a polling from a wireless LAN base station or may acquire a transmission right based on time-slot assignment in a time-divided frame.

When the sequence number managing unit 162 determines that there is a missing sequence number in the ACK map, the transmit-data generating unit 174 generates a packet (grant data) in which "1" is provided in an RDG/More PPDU field included in an HT control field in a MAC header. Specifically, the wireless communication apparatus 10A according to the present embodiment is triggered by the presence of packets accumulated in the buffer 158 due to the occurrence of data loss, to grant the transmission right to the wireless communication apparatus 10B which is a communication partner. By such a configuration, while latency is reduced, an improvement in throughput can be achieved.

The transmission processing unit 178 performs signal processing on an aggregated packet, a block ACK, etc., generated by the transmit-data generating unit 174, to convert the aggregated packet, block ACK, etc., into a radio-frequency signal. Note that the content of signal processing performed by the transmission processing unit 178 varies depending on the communication function implemented on the wireless communication apparatus 10A, as with the reception processing unit 154.

Note that although the above description is made of a configuration in which the wireless communication apparatus 10A functions as an initiator, the wireless communication apparatus 10A may be configured to function as a responder such as the wireless communication apparatus 10B.

[3] Operations of the Wireless Communication Apparatuses According to the Embodiment The configurations of the wireless communication apparatuses 10 according to the present embodiment are described above with reference to FIGS. 5 and 6. Now, exemplary operations of the wireless communication apparatuses 10 according to the present embodiment will be described with reference to FIGS. 7 and 8.

Figure 7:
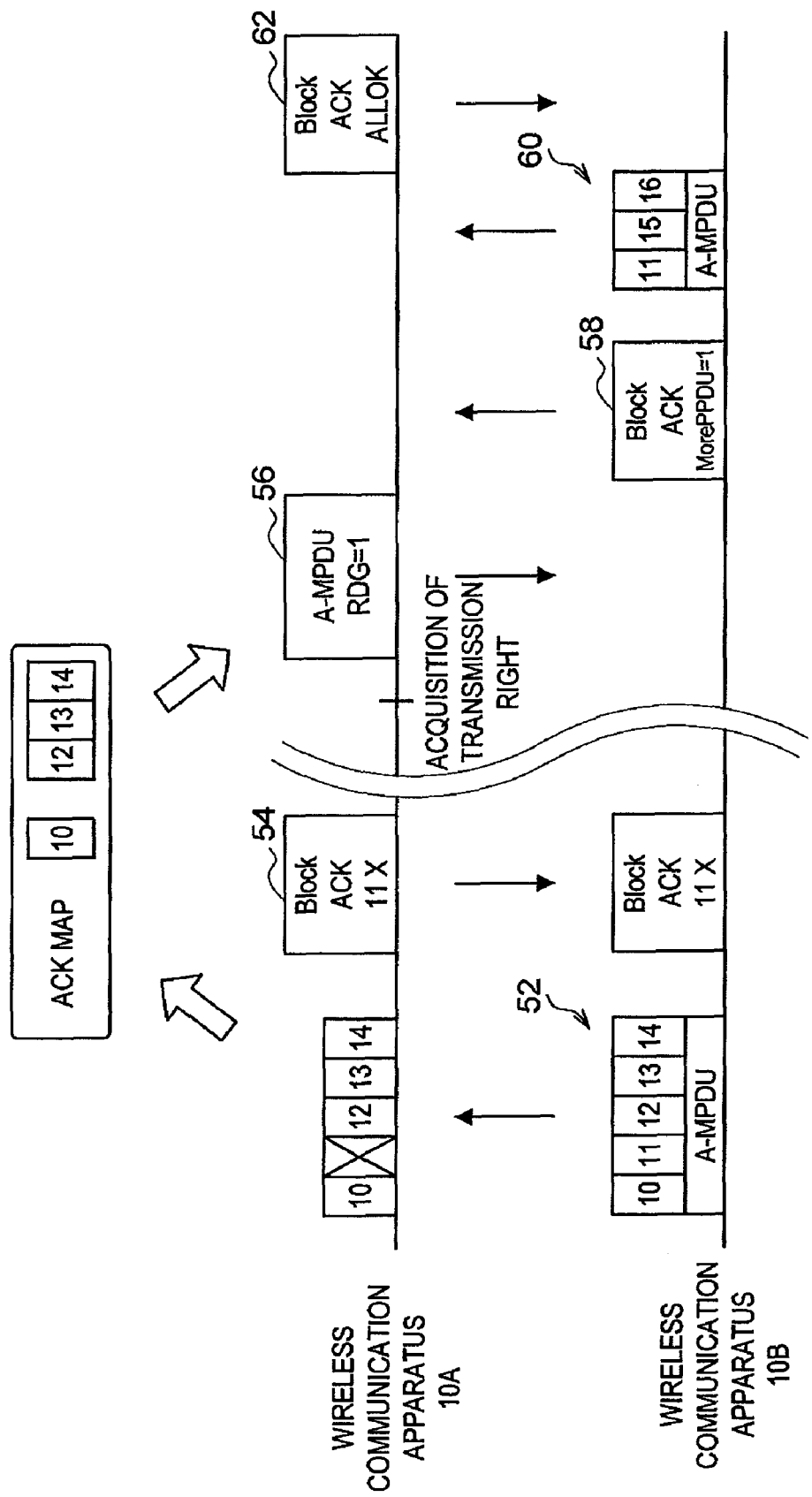
FIG. 7 is an illustrative diagram showing a specific example of communication performed between wireless communication apparatuses according to the present embodiment.

FIG. 7 is an illustrative diagram showing a specific example of communication performed between the wireless communication apparatuses 10A and 10B according to the present embodiment. First, as shown in FIG. 7, the wireless communication apparatus 10B transmits an aggregated packet (A-MPDU) to the wireless communication apparatus 10A. The aggregated packet 52 includes packets having sequence numbers 10 to 14, respectively.

However, when, as shown in FIG. 7, a packet having sequence number 11 has not been normally decoded in the wireless communication apparatus 10A, the sequence number managing unit 162 of the wireless communication apparatus 10A creates an ACK map in which sequence number 11 is missing. The transmit-data generating unit 174 of the wireless communication apparatus 10A generates a block ACK 54 indicating that a packet having sequence number 11 has not been able to be normally decoded. Then, the antenna 150 transmits the block ACK 54 to the wireless communication apparatus 10B.

Thereafter, when the transmission right acquiring unit 170 of the wireless communication apparatus 10A acquires a transmission right by a CSMA/CA procedure, the sequence number managing unit 162 checks the ACK map and thereby determines, in the example shown in FIG. 7, that sequence number 11 is missing. In response to the determination made by the sequence number managing unit 162, the transmit-data generating unit 174 generates an aggregated packet 56 in which "1" is provided in an RDG/More PPDU field included in an HT control field in a MAC header. Then, the antenna 150 transmits the aggregated packet 56 to the wireless communication apparatus 10B, whereby granting of the transmission right to the wireless communication apparatus 10B is performed.

When the wireless communication apparatus 10B receives the aggregated packet 56, the wireless communication apparatus 10B transmits a block ACK 58 responding to the aggregated packet 56. Since the block ACK 58 shows an intention of transmission, "1" is provided in an RDG/More PPDU field included in an HT control field in a MAC header. Thereafter, the transmit-data generating unit 108 generates an aggregated packet 60 including a packet having sequence number 11 held in the data buffer 120 and new packets (sequence numbers 15 and 16). Then, the antenna 116 transmits the aggregated packet 60 to the wireless communication apparatus 10A.

When all packets configuring the aggregated packet 60 have been normally decoded by the reception processing unit 154, the transmit-data generating unit 174 generates a block ACK 62 indicating that all packets have been normally received. Then, the antenna 150 transmits the block ACK 62. The sequence number managing unit 162 adds sequence number 11 to the ACK map, whereby sequence numbers in the ACK map become consecutive. Thus, packets with sequence numbers 10 to 14 are output from the buffer 158 to the upper layer 166. Also, a packet with sequence number 11 is deleted from the data buffer 120 of the wireless communication apparatus 10B.

Figure 8:
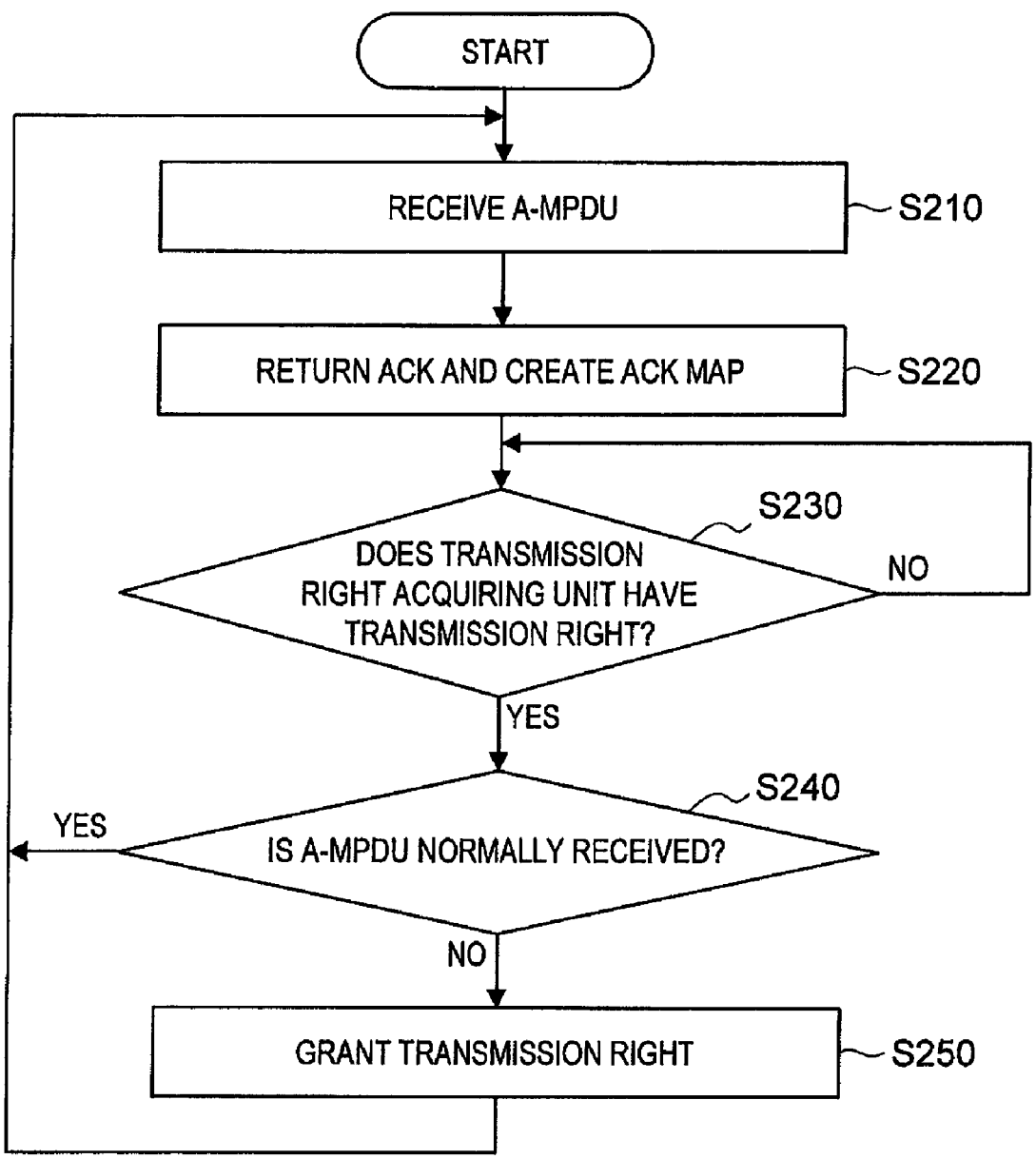
FIG. 8 is a flowchart showing the flow of an operation of the wireless communication apparatus that functions as an initiator.

FIG. 8 is a flowchart showing the flow of an operation of the wireless communication apparatus 10A that functions as an initiator. As shown in FIG. 8, first, when the wireless communication apparatus 10A receives an aggregated packet (S210), transmission of a block ACK generated by the transmit-data generating unit 174 and creation of an ACK map by the sequence number managing unit 162 are performed (S220).

Thereafter, when the transmission right acquiring unit 170 has acquired a transmission right by a CSMA/CA procedure (S230), the sequence number managing unit 162 determines by referring to the ACK map whether the aggregated packet has been normally received (S240). If the sequence number managing unit 162 determines that the aggregated packet has not been normally received, then the transmit-data generating unit 174 generates a packet for granting the transmission right to a communication partner and the packet is transmitted from the wireless communication apparatus 10A (S250).

[4] Conclusion

As described above, a wireless communication apparatus 10 according to the present embodiment holds an ACK map for packets configuring a received aggregated packet and performs granting of a transmission right, based on whether sequence numbers in the ACK map are consecutive. Such a wireless communication apparatus 10 according to the present embodiment exerts remarkable effects on an application that uses TCP such as wireless transmission of an HD stream.

Specifically, although a TCP ACK occurs in an opposite direction to a transmission direction of an HD stream, by performing granting of a transmission right based on an ACK map in the above-described manner, quick packet transfer to an upper layer is performed with the consecutiveness of sequence numbers being ensured, enabling to improve latency. In addition, since the frequency of requirements of a back-off operation that may be required to acquire a transmission right is suppressed, an improvement in throughput can be achieved.

It should be understood by those skilled in the art that various modifications, combinations, sub-combinations and alterations may occur depending on design requirements and other factors insofar as they are within the scope of the appended claims or the equivalents thereof.

For example, although an example is described above in which a wireless communication apparatus 10 determines whether to grant a transmission right, based on an ACK map, the present invention is not limited to the example. For example, the wireless communication apparatus 10 may determine whether to grant a transmission right, based on information provided in a beacon. The beacon is management information to be periodically transmitted from each of a plurality of communication apparatuses to form a wireless network by the communication apparatuses.

The beacon includes a field called TIM (Traffic Indication Map) in which information on whether there is a transmit packet is provided. Therefore, the wireless communication apparatus 10 refers to the TIM and if a communication partner has a transmit packet, then the wireless communication apparatus 10 grants a transmission right to the communication partner, whereby a reduction is latency and an improvement in throughput can be achieved.

Although in the above-described embodiment an example is described in which the wireless communication apparatus 10A functions as an initiator and the wireless communication apparatus 10B functions as a responder, the present invention is not limited to the example. For example, the wireless communication apparatus 10B may function as an initiator and the wireless communication apparatus 10A may function as a responder.

The steps in processes performed by the wireless communication apparatuses 10A and 10B in the specification do not necessarily need to be performed in time series in the order described in the schematic diagrams or flowchart. For example, each step in processes performed by the wireless communication apparatuses 10A and 10B may include a process that is performed parallelly or individually (e.g., a parallel process or process by an object).

Also, a computer program for causing hardware, such as a CPU, a ROM, and a RAM, included in the wireless communication apparatuses 10A and 10B to have functions equivalent to those of the configurations of the wireless communication apparatuses 10A and 10B can also be created. A storage medium having stored therein the computer program can also be provided. By configuring the functional blocks shown in the functional block diagrams in FIGS. 5 and 6 by hardware, a series of processes can also be implemented by the hardware.

The present application contains subject matter related to that disclosed in Japanese Priority Patent Application JP 2008-127333 filed in the Japan Patent Office on May 14, 2008, the entire content of which is hereby incorporated by reference.

What is claimed is:

1. A communication apparatus comprising:
a receiving unit that receives a data frame including a plurality of pieces of unit data transmitted from a communication partner;
a determining unit that determines whether there is data loss, for each piece of unit data included in the data frame received by the receiving unit;
a transmission right acquiring unit that acquires a transmission right; and
a generating unit that generates grant data for granting the transmission right acquired by the transmission right acquiring unit to the communication partner, when the determining unit determines that at least any one of the pieces of unit data has been lost.

2. The communication apparatus according to claim 1, further comprising a storage unit that stores determination results obtained by the determining unit,
wherein the generating unit generates the grant data based on the determination results stored in the storage unit, when the transmission right acquiring unit acquires a transmission right.

3. The communication apparatus according to claim 2, wherein
each of the pieces of unit data includes a piece of consecutive identification information,
the storage unit stores identification information of a piece of unit data that is determined by the determining unit to have not been lost, and
the generating unit generates the grant data when pieces of identification information stored in the storage unit are inconsecutive.

4. The communication apparatus according to claim 1, further comprising a transmitting unit that transmits determination results obtained by the determining unit to the communication partner.

5. The communication apparatus according to claim 1, wherein
the receiving unit receives from the communication partner management information for forming a wireless network by a plurality of communication apparatuses, and
the generating unit generates the grant data when the management information indicates that the communication partner has data destined for the communication apparatus.

6. A communication method comprising:
receiving, at a receiving unit, a data frame including a plurality of pieces of unit data transmitted from a communication partner;
determining, at a determining unit, whether there is data loss, for each piece of unit data included in the data frame;
acquiring, at a transmission right acquiring unit, a transmission right; and
generating, at a generating unit, grant data for granting the transmission right to the communication partner, when it is determined that any one of the pieces of unit data has been lost.

7. A non-transitory computer readable medium having stored thereon a program, which, when executed by a processor, causes a computer to:
receive a data frame including a plurality of pieces of unit data transmitted from a communication partner;
determine whether there is data loss, for each piece of unit data included in the data frame received by the receiving unit;
acquire a transmission right; and
generate grant data for granting the transmission right acquired by the transmission right acquiring unit to the communication partner, when the determining unit determines that at least any one of the pieces of unit data has been lost.

8. A communication system comprising:
a first communication apparatus that transmits a data frame including a plurality of pieces of unit data; and
a second communication apparatus including:
a receiving unit that receives the data frame;
a determining unit that determines whether there is data loss, for each piece of unit data included in the data frame received by the receiving unit;
a transmission right acquiring unit that acquires a transmission right; and
a generating unit that generates grant data for granting the transmission right acquired by the transmission right acquiring unit to the first communication apparatus, when the determining unit determines that at least any one of the pieces of unit data has been lost.

* * * * *